Figure 1:
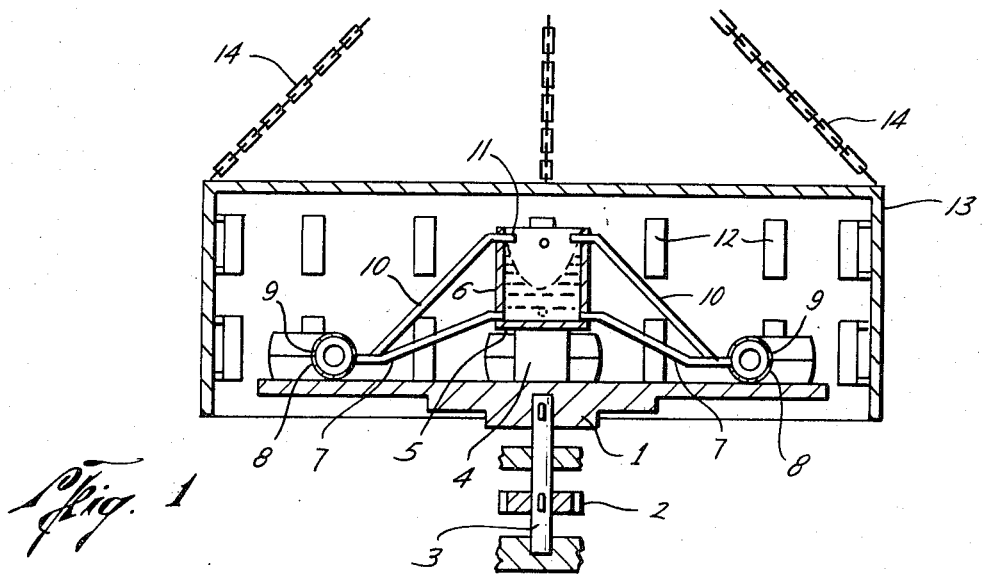

United States Patent
Barainsky et al.

[15] 3,642,399
[45] Feb. 15, 1972

[54] CENTRIFUGALLY CAST PIPE FITTINGS

[72] Inventors: Rudolf F. Barainsky, Bardenberg-Pley; Richard Kiefer, Bergisch-Gladbach; Hartmut Pankuweit, Liblar; Alfred G. Esser, Eschweiler, all of Germany

[73] Assignee: Deutsche Fibercast GmbH, Aachen, Germany

[22] Filed: Oct. 9, 1969

[21] Appl. No.: 864,999

[52] U.S. Cl. ............................ 425/117, 264/311, 425/169, 425/217
[51] Int. Cl. .................................................... B29c 5/04
[58] Field of Search ................. 264/302, 297, 257, 310, 311; 25/9, 26, 29; 18/26 RR, 26 R

[56] References Cited

UNITED STATES PATENTS

| 1,293,535 | 2/1919 | Perry | 264/311 X |
| 2,442,718 | 6/1948 | Woock | 18/26 RR UX |
| 2,885,733 | 5/1959 | Chupa | 264/302 |
| 2,993,235 | 7/1961 | Brown et al. | 264/311 X |

FOREIGN PATENTS OR APPLICATIONS 1,060,959  11/1953  France...................264/311

Primary Examiner—Robert L. Spicer, Jr.
Attorney—J. Vincent Martin, Joe E. Edwards and M. H. Gay

[57] ABSTRACT

An apparatus for centrifugally casting wherein a plurality of molds surround a resin tank on a centrifuge table. Feed lines communicate between each mold and the lower portion of the tank. Vent lines communicate between each mold and the upper part of the tank.

6 Claims, 2 Drawing Figures

PATENTED FEB 15 1972

3,642,399

Rudolf Barainsky
Richard Kiefer
Hartmut Pankuweit
Alfred Esser
INVENTORS

BY Vincent Martin
Joe E. Edwards
M. H. Gay
ATTORNEYS

CENTRIFUGALLY CAST PIPE FITTINGS

The invention concerns an arrangement for the manufacture of preferably glass-fiber reinforced castings of casting resin, for instance, epoxy resin.

To obtain castings of high strength and smooth surface, it is necessary to condense the resin in the mold. For this reason the known open molds, in which layers of fibers and resin are placed alternatingly, must be discounted. But with the conventional molds which can be closed and in which the filling operation is carried out under pressure it is also not possible to achieve a strength of the castings which would be comparable with that of castings or rotational symmetry made by the centrifugal casting process.

It has therefore already been proposed to move closed molds along a circular path and to connect the lower part of each mold, via pipes, to a tank which is filled with resin and which is arranged between the axis of rotation of the path and the molds and to provide organs in the upper part of each mold for the venting of air from the closed mold (German Pat. No. 1,225,372).

Although a moderate degree of densification of the resin can be achieved with this arrangement in the molds moving in a circular orbit, only forms of a certain shape, which, for instance, have no undercuts, can be filled with the resin, without voids as for instance, a part which is closer to the axis of rotation of the molds than the point of the resin feed or air venting, respectively, can eventually no longer be vented and remains void of resin. But also the air bubbles which invariably appear in the molding material have therefore no opportunity to escape from the mold.

The invention addresses itself to the task to create a simplified arrangement for the manufacture of castings which produces a completely condensed structure of the casting, free of voids, in a short time and independently of the shape of the molds.

Starting out with an arrangement for the manufacture of preferably glass-fiber reinforced castings of casting resin, for instance, epoxy resin which during the molding process is subjected to a centrifugal force, wherein it flows into the cavities, containing glass-fiber fabric, of parted molds which move along a circular path, the task is solved according to the invention by that the molds are arranged along a circle about the axis of rotation in such a manner that each mold is located closest to the fulcrum only with a narrowly limited part of its cavity and is connected at that point with two pipe lines, one of which feeds the resin from a centrally arranged tank into the mold, while the other serves for the venting of the mold.

In contrast to the known arrangement the design according to the invention dispenses with multiple tanks, which due to the relatively short setting time of the resins require suitable attention after each molding operation, and instead uses only one, centrally arranged tank for all molds.

It is true that in the proposal described above the possibility is considered to provide only one tank for all molds. As the tank, however, should be given a place between the axis of rotation and the mold, the tank would have to have excessively long; winding pipe lines which, aside from the cost, impede an accelerated transport of the resin and encourage clogging of the lines and uneven distribution to the individual molds.

In addition to the simplified design of the arrangement according to the invention, there is the considerably more significant advantage that even more complicated shapes of the castings do not prevent a structure free of voids, as due to the effective centrifugal force the part of the cavity closes to the fulcrum is vented in any event up to the last moment and remains accessible to the resin.

Especially intensive densification can be obtained through a further development of the arrangement according to the invention by mounting the molds on a rotary table which drives via a planetary gear the tank at the center of the table at the same angular speed at alternatingly increasing and decreasing distance from the individual molds.

In this arrangement the invention exploits the pulsating increase and decrease of the centrifugal force action due to the constantly changing radius and therewith achieves a densification unsurpassed by the known centrifugal casting methods. Additionally, the invention achieves the effect with this arrangement that because of the constant change of the radius the resin in the tank is subjected to thorough mixing and that the feed lines remain in motion, which counteracts the danger of clogging.

But even with a fixed arrangement of the tank at the center of the rotary table, the arrangement according to the invention achieves castings with strength known from the conventional centrifugal casting method. With this arrangement can be produced, for instance, pipe elbows which find application in pipe line systems with pipes made by the centrifugal casting method and can stand the same stresses without damage, as extensive tests have confirmed.

In order to perform the molding operation in a short time and not to have to continue driving the rotary table until the castings solidify, the invention proposes to arrange the tank adjustable in height, but with the lowest point of its interior at the same level or higher than the highest point of the cavity of the molds.

Through this arrangement the not yet solidified resin is prevented from returning to the tank completely or partially as soon as it is no longer subjected to the centrifugal force.

How little obvious the simple solution of this problem according to the invention is, is demonstrated by an elaborate proposal of recent time which provides to close the molds after the filling operation with a resin which hardens faster than the filled-in resin (German Pat. No. 1,113,009).

The arrangement of the tank in accordance with the invention has furthermore the effect that due to the level difference resin flows toward the molds already before the rotation of the centrifuge table starts. Thereby the resin which has already flowed to the molds is acted upon, when the centrifuge table starts to rotate, by a centrifugal force increased in accordance with the increased radius, which draws the remainder of the resin from the tank in a continuous flow, so that the resin still in the tank is subjected, in addition to the lesser centrifugal force due to the smaller radius, to an intensive suction force. The tank can therefore be given, without consideration of the centrifugal force, a relatively small diameter without the resulting small centrifugal force in the interior of the tank have a detrimental effect on the material flow, as the suction force does not permit the stream of resin to tear off.

The invention proposes furthermore that the venting line is led from each mold upward in the direction of the axis of rotation and has a capacity which is equal or greater than the capacity of the feed line.

With this design the invention assures the quantity of resin which is subject to the centrifugal force and which may possibly be too large cannot exit toward the end of the molding process through these venting lines as the venting line can take up at least the same amount of casting resin as the feed line and centrifugal forces of the same direction are effective in both lines.

Finally the invention also proposes that an organ is arranged in the venting line which indicates the end of the filling process so that the operating personnel can terminate the rotation of the molds after the completion of the molding process with an accurately determinable delay. For the purpose of automatizing, the organ in the venting line can, however, also be connected with a timing relay which terminates the molding process automatically, according to the invention.

Figure 2:
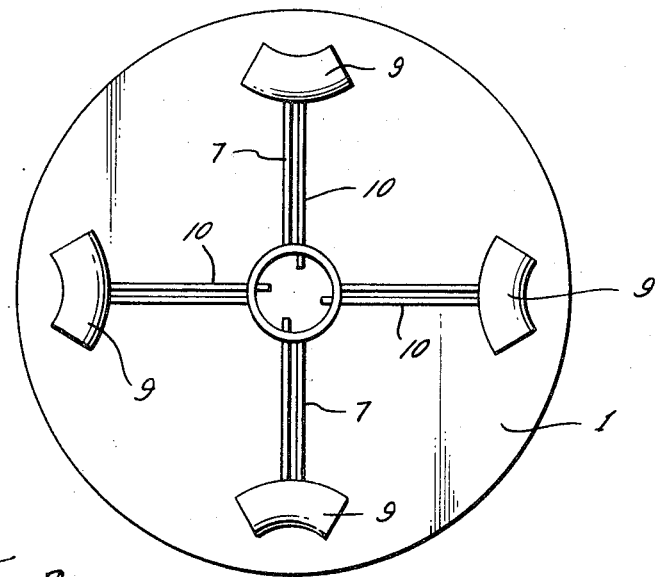

An example of implementation of the arrangement according to the invention for the manufacture of pipe elbows is shown schematically in the drawing and is described in greater detail in the following:

FIG. 1 shows the arrangement in a vertical cross section and;

FIG. 2, in top view.

On a horizontally arranged centrifuge table 1 which is supported by a shaft 3 driven via a pinion 2 a tank 6 containing resin 5 is attached on a centrically arranged console 4.

In the sidewall of the tank 6 are connected, directly above the bottom, feed lines 7 which are in connection with the cavities 8 of the molds 9 for the manufacture of pipe elbows which are arranged on the centrifuge table 1 along a circular path.

The molds 9 are arranged on the centrifuge table 1 in such a manner that each cavity 8 is closest to the axis of rotation of the centrifuge table 1 with a tangent of the outer arc.

At the tangent is connected to the cavity 8 of each mold 9, next to the mouth of the feed line 7, a venting line 10 which is brought into the upper part of the tank 6 so far that its end piece 11 goes through the paraboloid of the liquid.

A bell 13 equipped with heat radiators 12 and enclosing a ring-shaped space is suspended in floating condition by the chains 14 which can move up and down, and serves to heat the molds 9 arranged on the centrifuge table 1, the tank remaining unheated.

The manner of operation of the arrangement is as follows:

After the cores wound with glass fiber have been placed in the parted molds 9, the lines 7 and 10 are introduced into the recesses provided in the parting plane of the molds 9 and the upper parts of the molds are put in place and firmly connected with the lower parts.

Hereupon a quantity of resin corresponding to the cavities 8 is filled into the tank 6 and the heating bell 13 is brought into the position shown in FIG. 1.

Because of the rotation of the centrifuge table which has now started there acts on the resin which has partially flowed to the molds due to the difference in level, a centrifugal force which draws the remaining resin from the tank 6 and subjects it also to an increasing centrifugal force. While the glass fibers in the cavities are thereby being impregnated the casting are built up from the outside toward the inside to the axis of rotation of the centrifuge table 1 without voids and, after a short spinning time, exhibit a very high strength in the hardened condition.

What is claimed is:

1. Arrangement for the manufacture of preferably glass-fiber reinforced castings of casting resin, for instance, epoxy resin which is subjected to a centrifugal force during the molding process,
   wherein it flows via pipes to cavities which contain the glass-fiber fabric,
   of parted molds (9) moving along a circular path,
   characterized by that the molds (9) are arranged about an axis of rotation on a circle in such a manner that each mold (9) is closest to the center of rotation only with a narrowly limited part of its cavity (8) and is connected at this pint to pipe lines (7; 10),
   of which always one line (7) feeds the resin (5) from a centrally arranged tank (6) into the mold (9),
   while the other line (10) serves for the venting and overflow of the mold (9) and returns to the fill tank.

2. Arrangement according to claim 1, characterized by that the molds (9) are mounted on a rotary table (1) which drives the tank (6) at the center via a planetary gear at the same angular speed at alternatingly increasing and decreasing distance from the individual molds (9).

3. Arrangement according to claim 1,
   characterized in that the tank (6) is arranged adjustable in height,
   but with the lowest point of its interior space at the same level or higher than the highest point of the cavity (8) of the molds (9).

4. Arrangement according to claim 1,
   characterized in that the venting line (10) is brought upwards in the direction of the axis of rotation and has a capacity which is equal or greater than the capacity of the feed line (7).

5. Arrangement according to claim 1,
   characterized in that in the venting line (10) provides an organ indicating the completion of the filling operation.

6. Arrangement according to claim 2, characterized in
   that the tank (6) is arranged adjustable in height, but with the lowest point of its interior space at the same level or higher than the highest point of the cavity (8) of the molds (9),
   that the venting line (10) is brought upward in a direction of the axis of rotation and has a capacity which is equal or greater than the capacity of the feed line (7) and
   that the venting line (10) provides an organ indicating the completion of the filling operation.

* * * * *